Figure 1:
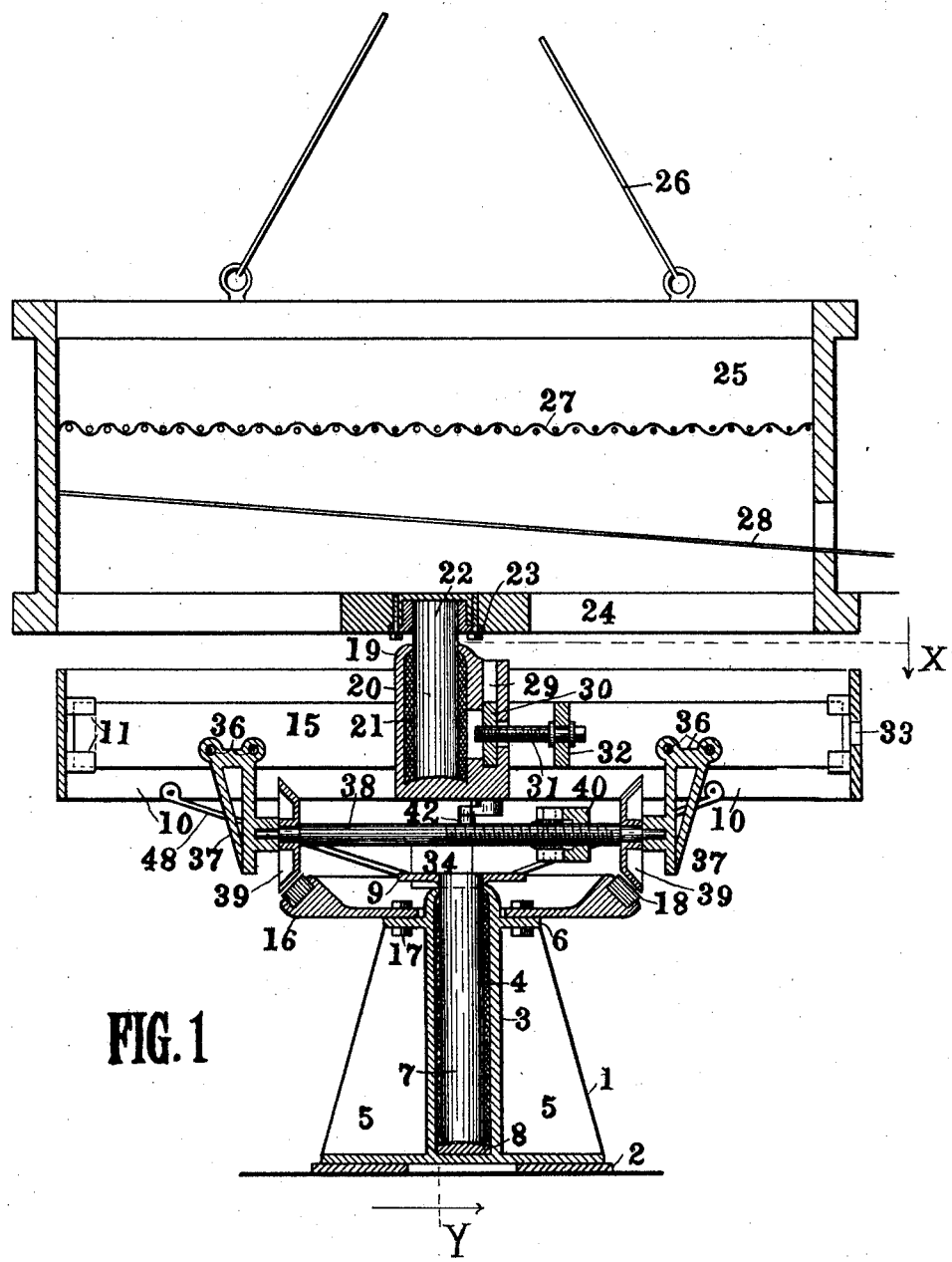

R. R. WATTERS.
GOVERNOR FOR ROTATING SIEVES AND THE LIKE.
APPLICATION FILED NOV. 13, 1908.

1,002,476.

Patented Sept. 5, 1911.

3 SHEETS—SHEET 1.

WITNESSES
A. E. Kling
Glenara Fox

INVENTOR
Rama R. Watters
by C. E. Humphrey
ATTORNEY.

R. R. WATTERS.
GOVERNOR FOR ROTATING SIEVES AND THE LIKE.
APPLICATION FILED NOV. 13, 1908.
1,002,476.
Patented Sept. 5, 1911.
3 SHEETS—SHEET 2.
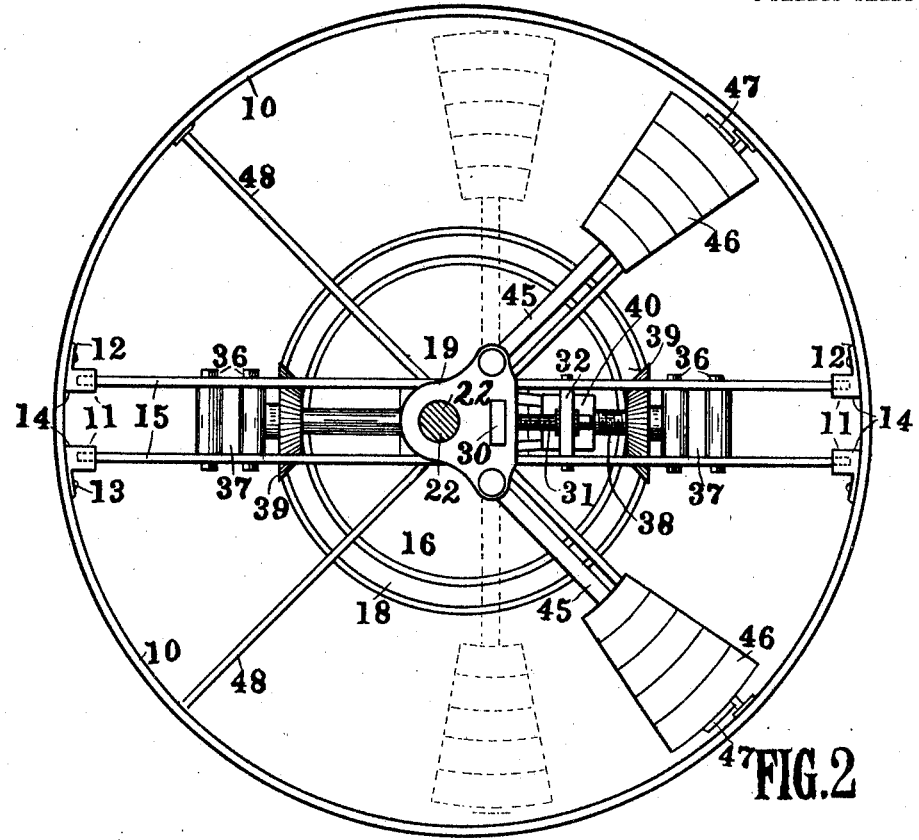
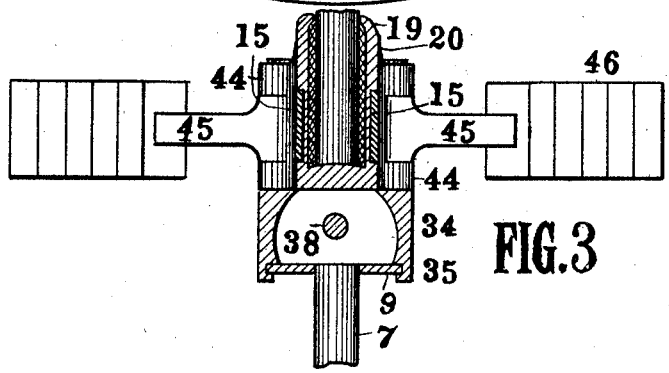
WITNESSES
A. E. Kling
Glenara Fox
INVENTOR
Rama R. Watters
by C. E. Humphrey
ATTORNEY.

R. R. WATTERS.
GOVERNOR FOR ROTATING SIEVES AND THE LIKE.
APPLICATION FILED NOV. 13, 1908.
1,002,476.
Patented Sept. 5, 1911.
3 SHEETS—SHEET 3.
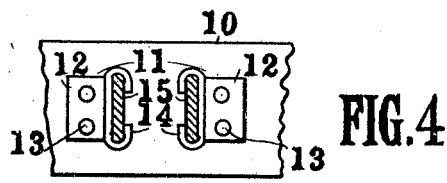
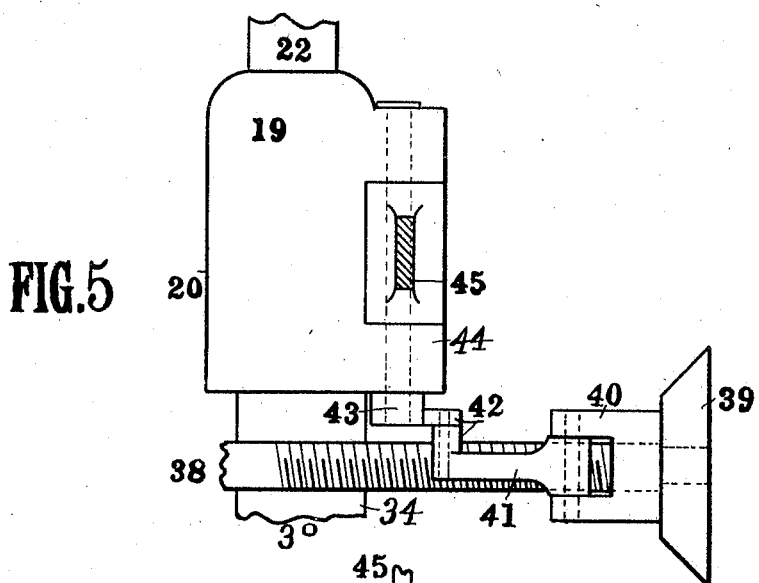
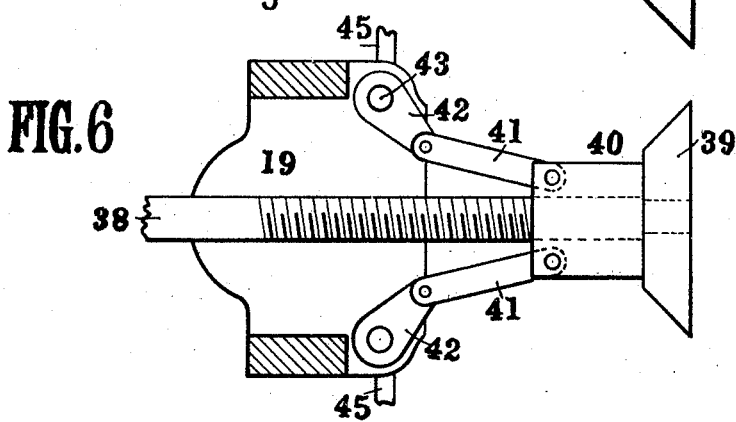

UNITED STATES PATENT OFFICE.

RAMA R. WATTERS, OF AKRON, OHIO.

GOVERNOR FOR ROTATING SIEVES AND THE LIKE.

1,002,476. Specification of Letters Patent. Patented Sept. 5, 1911.

Application filed November 13, 1908. Serial No. 462,500.

*To all whom it may concern:*

Be it known that I, RAMA R. WATTERS, a citizen of the United States, residing at Akron, in the county of Summit and State of Ohio, have invented new and useful Improvements in Governors for Rotary Sieves and the Like, of which the following is a specification.

This invention relates to governors for regulating and maintaining evenness of revolution of such devices as sieves, screens, conveyers and the like.

In screens, sieves, conveyers and other devices which are necessarily revolved as an incident to their employment, experience has demonstrated that the movement of the same varies materially with respect to whether or not the devices are loaded heavily or lightly, so much so that the variance in the movement thereof decreases the effective operation of the same, unless some means are employed to control and regulate their movement so as to maintain it at all times approximately the same, the full efficiency of the device is not obtained.

The object of the invention, therefore, is to provide a device adapted to revolve or swing a sieve, screen or like device orbitally, provided with means for governing the movement thereof whereby the evenness of said movement is substantially maintained at all times, irrespective of whether the device is loaded or substantially empty.

A further object of this invention is to produce a simple and effective device for the purpose named which will be strong, safe and durable, effectual in operation, readily set up and comparatively cheap to manufacture.

With the foregoing and other objects in view, the invention consists in the novel construction, combination and arrangement of parts constituting the invention to be hereinafter more specifically described and illustrated in the accompanying drawings which form a part hereof, wherein is shown the preferred embodiment of the invention, illustrated by way of example in connection with a screen used for separating comminuted material, but it is to be understood that changes, variations and modifications can be resorted to which come within the scope of the claims hereunto appended.

In the drawings, in which similar reference numerals indicate like parts in the different figures, Figure 1 is a central, vertical, sectional view of my invention shown in operative relation with a screen or sieve. Fig. 2 is a section of Fig. 1 on line X. Fig. 3 is a section of part of the device shown in Fig. 1 on line Y thereof; and, Figs. 4, 5 and 6 are details of certain mechanism employed in the device.

Referring specifically to the drawings, the reference numeral 1 denotes an upwardly-extending standard or housing mounted on suitable supports 2. The central portion of the housing embodies an upwardly-extending cylinder 3 provided with a lining of Babbitt or other friction reducing metal 4. Extending laterally from the side of the cylinder 3 are braces 5, the upper portions of which are formed integral with an annular flange extending transversely from the side of the cylinder 3.

Mounted in the cylinder 3 is an upwardly-extending revoluble shaft 7 the lower end of which is adapted to rest on a friction-reducing plate 8 positioned in the bottom of the cylinder 3. Secured fixedly on the upper end of the shaft 7 is a head 9 from which extend inclined braces 48 on the outer ends of which is mounted a horizontal ring 10 and having their inner ends attached to the outer edges of the head 9, by which revolution of the same, in unison with the shaft 7 is secured. At opposite points on the inner face of the ring 10 are two pairs of members 11, each consisting of a plate 12 (see Fig. 4) secured by holdfast devices 13 to the inner face of the ring and each provided with a combined supporting and guiding member 14 preferably formed integral therewith. Mounted in the members 14 are a pair of parallel bars 15 extending across the space inclosed by the ring 10 and arranged to slide therein by reason of the fact that the bars are less in length than the interior diameter of the ring 10, thereby permitting a longitudinal movement of these two bars.

Mounted on the flange 6 of the housing 1 is a fixed friction disk 16 provided with a central aperture to receive the upper end of the cylinder 3 and secured in position on the flange 6 by means of holdfast devices 17. The outer face of the disk 16 is preferably formed at an angle of 45° with the axis of the shaft 7 and is provided with an embedded wear-resisting friction ring 18 fixedly secured therein against rotation.

Mounted on the bars 15 is a carriage, hereinafter designated generally by the reference numeral 19 comprising a body portion provided with parallel, horizontal apertures to slidably receive the bars 15, whereby the same is shiftably mounted. The body portion of the member 19 comprises a cylindrical portion 20 provided with a lining of Babbitt of other friction-reducing material 21 in which is mounted a spindle 22, the upper end of which is secured in a socket 23 on the lower portion of a frame 24 of a screen 25 provided with supporting members 26 and having a sieve 27 with a receptacle 28 onto which the screened material falls during the operation of the device. The screen 25, hereinafter generally known by its numeral 25 may be of any preferred construction, but for the purpose of illustrating the operation of this device, the construction shown in Fig. 1 of the drawings is deemed sufficient.

In order to move the carriage 19 on the bars 15 to a position eccentric to the axis of revolution of the ring 10, thereby securing an orbital movement of the screen 25 and maintain said carriage fixedly in position, the body portion thereof is provided with an upwardly-extending pocket 29 in which is disposed a nut 30 having a threaded aperture to receive a set-screw 31 mounted in a cross-bar 32 extending between the bars 15 and held in position by suitable holdfast devices. The wall of the carriage 19 is provided with an aperture through which the set screw 31 extends into engaging relation with the nut 30 in the pocket 29 and the set-screw is revolved by means of a suitable wrench (not shown) adapted to be passed through a suitable opening 33 in the ring 10. By manipulating the screw 31 the carriage 19 is moved toward or away from the axis of revolution of the shaft 7 and there held fixedly in position against further movement, as shown in the drawings, wherein the spindle 22 is arranged to the left of said axis in Fig. 1.

Depending from the cylindrical portion 20 of the carriage 19 are two integral legs 34, spaced apart, provided with grooves 35 near their lower ends to slidably receive the head 9 of the shaft 7, for a purpose to be later described.

Extending between the bars 15 and held by suitable holdfast devices 36 are a pair of brackets 37 designed to rotatably support the outer ends of a threaded shaft 38 having fixedly mounted thereon adjacent the bracket 37 a pair of beveled friction wheels 39, normally arranged to lie out of contact with the ring 18 but capable of engaging the same and receiving motion therefrom during the operation of the device. Mounted on the threaded portion of the shaft 38 is a nut 40, to the outer, front, lateral portions of which are pivotally-connected a pair of links 41 the outer ends of which are pivotally-connected with crank-arms 42 on the lower ends of vertical shafts 43 rotatably-mounted in a pair of spaced lugs 44 formed integral with the body portion of the carriage 19. Mounted on each of the shafts 43 between the lugs 44 is a T-shaped sleeve provided with an integral, laterally-extending arm 45 bearing on the outer end thereof a counter weight 46 held from unintentional removal therefrom by means of an enlarged head 47 on the end of the arm 45.

The operation of the device is as follows: Assuming that the carriage 19 has been moved to a position eccentric to the axis of revolution of the shaft 7 and ring 10, the rotation of the latter elements will cause a simultaneous orbital movement of the sieve or screen 25 in unison therewith by reason of the fact that the spindle 22 carried by the carriage 19 is positioned in the socket 23 of the frame 24. When a load of unusual weight is placed in the screen 25, the excess of weight will cause the latter to exert a greater centrifugal force on the carriage 19 than is normally present when the sieve or screen is running substantially empty. The normal effect of this increase of centrifugal action would be to cause the carriage 19 to move outwardly away from the axis of revolution of the shaft 7, but as this carriage is fixedly held by means of the set-screw 31 in a definite position on the bars 15, the bars themselves will slide in the guide members 14 in a direction away from the center of revolution of the device. This action of the screen, in causing a sliding movement of the bars 15 outwardly would, under normal circumstances, cause an uneven and somewhat dangerous revolution of the entire device, by reason of the fact that the load carried by the device is not properly counter-balanced and in order to compensate for this increased load and to restore as far as possible the normal balance of the entire device the mechanism mounted on the threaded shaft 38 is brought into action and its operation is as follows: As the bars 15 slide outwardly in the guide members 14, the brackets 37 will move in unison therewith and this will bring one of the beveled friction wheels 39 into engaging relation with the ring 18, causing it to revolve, thereby producing rotation of the threaded shaft 38 which will cause the nut 40 to move toward the axis of revolution of the device, resulting in a simultaneous movement of the crank-arms 42 inwardly, producing a reverse movement of the arms 45, causing them to move rearwardly toward each other, thereby moving the weights carried thereby to the opposite side of the device from that in which is positioned the spindle 22 and in a measure counter-balancing the load on the screen 25. When the material held by the screen or sieve 25 has passed therethrough and been carried outwardly by the receptacle 28 and the load on the screen thereby diminished, the weights 46, being still in the position which they were caused to assume by the load, as already described, will now tend to slide the bars 15 and their connected mechanism in a reverse direction which will bring the opposite beveled friction wheel 39 into operative engagement with the ring 18, causing thereby a reverse rotation of the shaft 38 and a return of the nut 40 to its original position, which causes the weights to move to the position shown in dotted lines in Fig. 2, where they will remain until another load or unusual burden is placed in the sieve 25, after which the foregoing operation will be repeated.

What I claim and desire to secure by Letters Patent, is:—

1. A governing device for a circularly-moving sieve comprising a rotatable shaft having a fixed axis of rotation, means supported by and rotatable with said shaft embodying a pair of diametrically-opposed, combined supporting and guiding members, a radially-shiftable bar supported by said members, a carriage mounted on said bar eccentric to the axis of said shaft, means connecting said carriage and said sieve whereby the path of movement of said carriage changes with the variations in movement of said sieve due to the variations in centrifugal force exerted on said sieve by different loads, a swinging counter-weight carried by said carriage capable of being swung to a position to counterbalance the varying loads on said sieve and reversely operable means arranged to be brought into operation by the opposite reciprocations of said bar for changing the position of said counterweight, substantially as described.

2. A governing device for a circularly moving sieve comprising a rotatable shaft having a fixed axis of rotation, an annulus connected with and supported by said shaft and revolving therewith, a pair of oppositely-disposed combined supporting and guiding members carried by said annulus, a radially-shiftable bar mounted in said members, an adjustable carriage on said bar and eccentric to the axis of said shaft, connecting means extending between said carriage and said sieve whereby the latter is revolved, a swinging counterweight pivoted to said carriage, a pair of brackets mounted on said bar, a threaded shaft extending between said brackets, a pair of oppositely-disposed friction wheels on said threaded shaft, a suitably supported friction ring arranged to be alternately engaged with said friction disks due to the opposite reciprocations of said bar, a nut mounted on said threaded shaft, and means connecting said nut with said swinging counterweight for moving the latter into a position to counterbalance the varying loads on said sieve.

3. A governing device for a circularly moving sieve comprising a rotatable shaft having a fixed axis of rotation, a pair of supporting members carried by said shaft, a radially-shiftable bar mounted in said members, a carriage eccentric to the axis of said shaft mounted on said bar, means connecting said carriage and sieve, a swinging counterweight pivotally mounted on said carriage and capable of being swung to counter-balance varying loads on said sieve, a threaded shaft carried by said bar, means on said shaft connected with said counterweight for moving the latter, a pair of friction-wheels on said threaded shaft, and an irrevoluble friction disk arranged to be alternately engaged by said friction wheels for alternately revolving said threaded shaft for shifting the position of the means connected with said counterweight to cause the latter to counter-balance the varying loads placed on said sieve.

In testimony whereof I have hereunto set my hand in presence of two subscribing witnesses.

RAMA R. WATTERS.

Witnesses:
 F. H. STUART,
 C. E. HUMPHREY.

---

Copies of this patent may be obtained for five cents each, by addressing the "Commissioner of Patents, Washington, D. C."